E. L. JOSEPH.
APPARATUS FOR TRANSFORMING CONTINUOUS CURRENTS INTO ALTERNATING CURRENTS.
APPLICATION FILED NOV. 24, 1911.
1,042,446.
Patented Oct. 29, 1912.
2 SHEETS—SHEET 2.
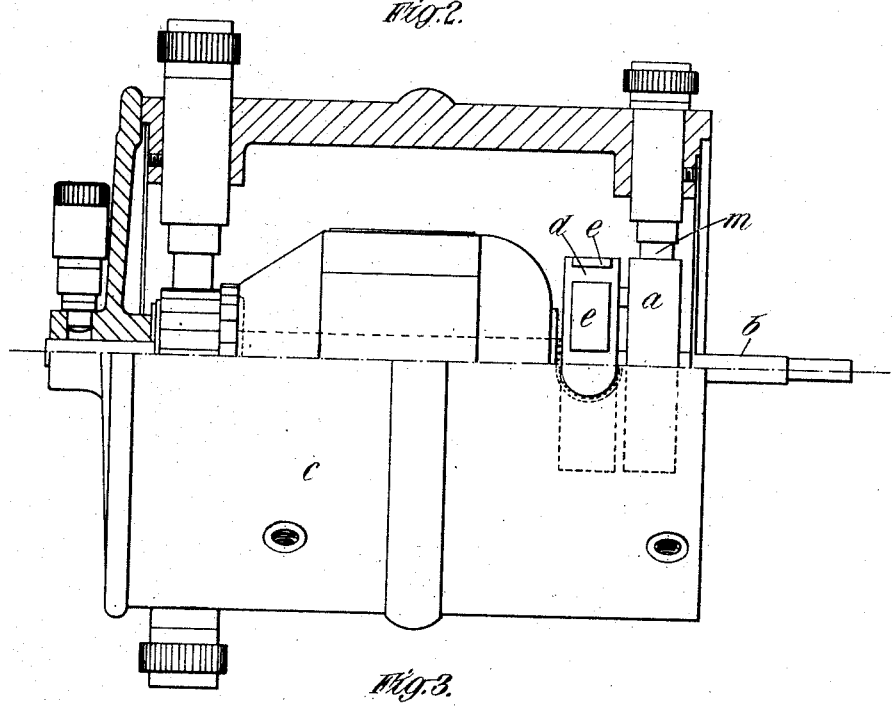
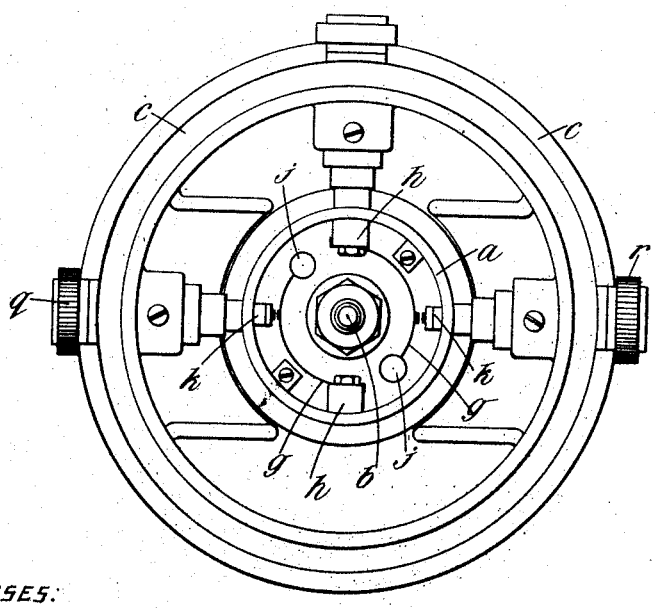
WITNESSES:
Louis Alexander
Fritz Ziegler Jr.
INVENTOR
EDWARD L. JOSEPH
BY
ATTORNEYS though reference letters indicate corresponding

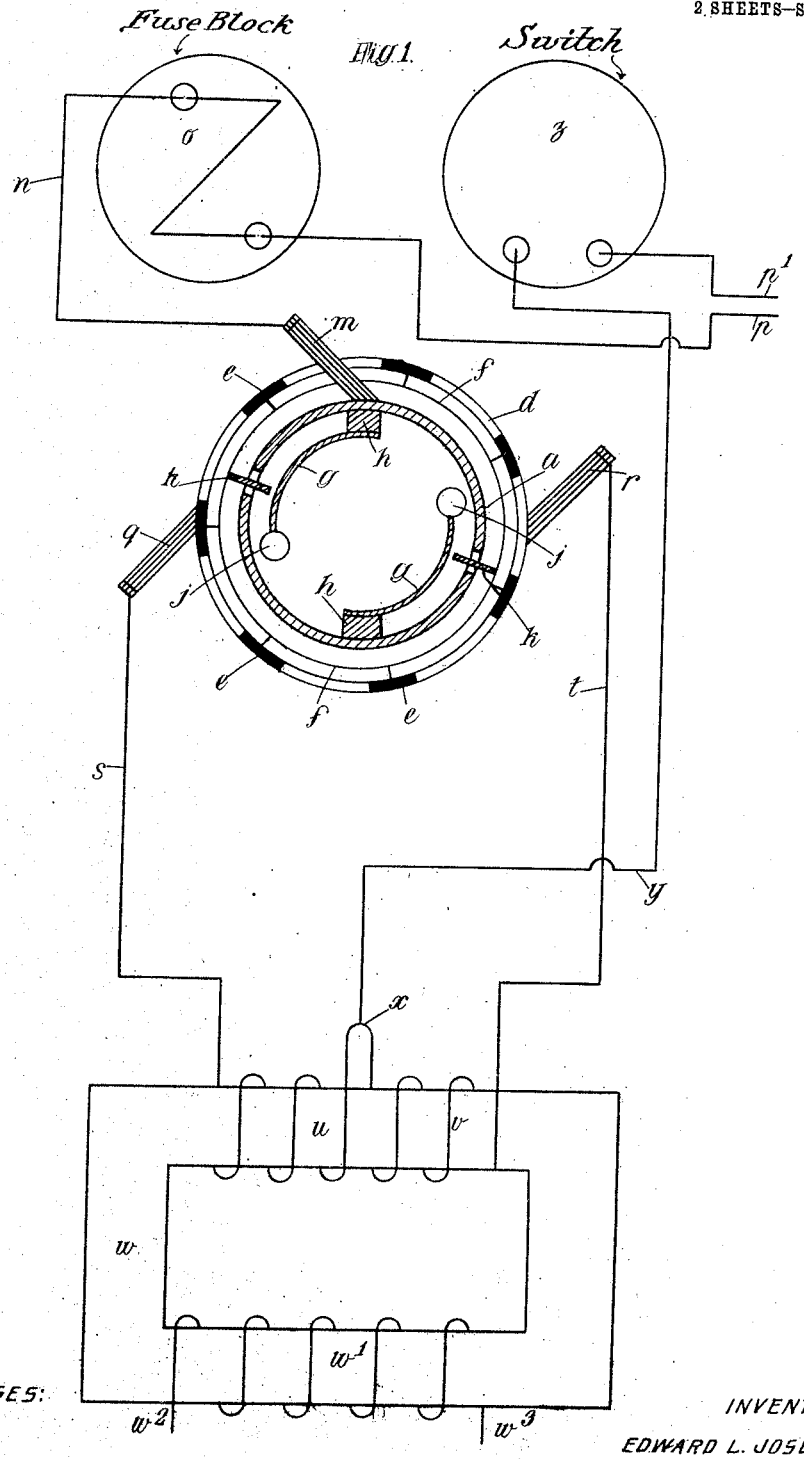

UNITED STATES PATENT OFFICE.

EDWARD LIONEL JOSEPH, OF LONDON, ENGLAND.

APPARATUS FOR TRANSFORMING CONTINUOUS CURRENTS INTO ALTERNATING CURRENTS.

1,042,446.  Specification of Letters Patent.  Patented Oct. 29, 1912.

Application filed November 24, 1911. Serial No. 662,178.

*To all whom it may concern:*

Be it known that I, EDWARD LIONEL JOSEPH, a subject of the King of Great Britain, and resident of 96 Victoria street, in the city of Westminster, London, England, managing director, have invented certain new and useful Improvements in Apparatus for Transforming Continuous Currents into Alternating Currents, of which the following is a specification.

This invention relates to apparatus for transforming continuous currents into intermittent currents of the kind wherein a rotating commutator or distributer secured to the spindle of an electric motor and provided with the necessary brushes alternately closes a circuit connected to an extraneous supply of continuous current through the one or the other of a pair of oppositely wound coils forming the primary winding of a transformer.

In apparatus constructed in accordance with the present invention, the slip ring and the commutator are mounted upon, but insulated from, the spindle of the electric motor, while the brushes which bear upon said ring and commutator are similarly mounted on the casing of the motor. The slip ring is provided with automatically actuated and speed-controlled means adapted to connect electrically the slip ring with the commutator as soon as the speed of rotation of the motor reaches a predetermined value.

The invention will be described with reference to the accompanying drawings wherein—

Figure 1 is a wiring diagram showing the commutator and transformer in schematic form. Fig. 2 is a side view, parts being shown in section, of the commutator mounted upon the spindle of an electric motor, and Fig. 3 an end view of the same apparatus.

Referring to the drawings wherein similar reference letters indicate corresponding parts, $a$ is a metal slip ring mounted on but insulated from the spindle $b$ of an electric motor $c$. $d$ is a commutator similarly mounted upon the spindle $b$ and consisting preferably of an uneven number of separate segments $e$ all of which are electrically connected together by a second ring $f$.

$g$ are resilient arms each secured at one extremity as at $h$ to the ring $a$ and provided at their other or free extremity with a weight $j$. When rotatory motion is imparted to the commutators the arms $g$, when a certain predetermined speed has been reached and under the action of centrifugal force, fly out and come into contact with stops $k$ integral with ring $f$ and so put the segments $e$ into electrical communication with the slip ring $a$.

$m$ is a brush insulated from the frame of the electric motor $c$ and adapted to press upon the slip ring $a$. This brush is connected by a wire $n$ and through a fuse $o$ to conductor $p$ connected to one polarity of a source of continuous current.

$q$ and $r$ are a pair of oppositely arranged and insulated brushes respectively connected by wires $s$, $t$ to the coils $u$, $v$ forming the primary winding of a transformer $w$. The two coils $u$ and $v$ are wound in opposite directions and the free extremities of their windings are connected together as at $x$ and are furthermore connected by means of a wire $y$ and through a switch $z$ to a conductor $p^1$ connected to the opposite polarity of the source of current previously referred to.

$w^1$ is the secondary winding of the transformer $w$ provided with conductors $w^2$ and $w^3$ adapted to be connected to the alternating current utilizing devices.

In use, the motor $c$ is first rotated by current supplied to it and thereupon the switch $z$ is closed. When the motor has then attained a certain predetermined speed the arms $g$ fly out under the action of centrifugal force and electrically connect the slip ring $a$ with the segments $e$. Intermittent continuous currents will then be caused to alternately pass through the coils $u$, $v$ which will induce true alternating currents in the secondary winding of the transformer. These currents may be used for wireless telegraphy, for the production of ozone, nitrogen compounds, etc., for vacuum lighting and other apparatus wherein it is either essential or desirable to employ alternating currents whose values graphically correspond to a sinusoidal curve.

Claim:

In apparatus for transforming continuous currents into intermittent currents, a motor driven commutator made up of a slip ring section and a segmental section, insulated from one another, and speed controlled means automatically actuated to electrically connect the two commutator sections.

EDWARD LIONEL JOSEPH.

Witnesses:
HERBERT D. JAMESON,
O. J. WORTH.